US007730037B2

(12) United States Patent
Jajodia et al.

(10) Patent No.: US 7,730,037 B2
(45) Date of Patent: Jun. 1, 2010

(54) FRAGILE WATERMARKS

(75) Inventors: Sushil Jajodia, Oakton, VA (US); Huiping Guo, Monterey Park, CA (US); Yingjiu Li, Singapore (SG)

(73) Assignee: George Mason Intellectual Properties, Inc., Fairfax, VA (US)

( * ) Notice: Subject to any disclaimer, the term of this patent is extended or adjusted under 35 U.S.C. 154(b) by 218 days.

(21) Appl. No.: 11/250,460

(22) Filed: Oct. 17, 2005

(65) Prior Publication Data

US 2006/0095775 A1 May 4, 2006

Related U.S. Application Data

(60) Provisional application No. 60/619,040, filed on Oct. 18, 2004.

(51) Int. Cl.
G06F 7/00 (2006.01)
G06F 17/30 (2006.01)
(52) U.S. Cl. ....................... 707/687; 713/176
(58) Field of Classification Search ................ 707/1, 707/3, 101, 687, 999.001; 713/176
See application file for complete search history.

(56) References Cited

U.S. PATENT DOCUMENTS

| 5,924,094 | A * | 7/1999 | Sutter ................ 707/10 |
| 6,519,604 | B1 * | 2/2003 | Acharya et al. ........... 707/102 |
| 6,587,944 | B2 * | 7/2003 | Yeung et al. ............ 713/176 |
| 7,313,248 | B2 * | 12/2007 | Tonisson ................. 382/100 |
| 7,454,797 | B2 * | 11/2008 | Zhu et al. ............... 726/30 |
| 2003/0028509 | A1 * | 2/2003 | Sah et al. ................ 707/1 |
| 2004/0243816 | A1 * | 12/2004 | Hacigumus et al. ....... 713/193 |
| 2005/0147246 | A1 * | 7/2005 | Agrawal et al. .......... 380/44 |
| 2005/0257067 | A1 * | 11/2005 | Roberts ................. 713/186 |

OTHER PUBLICATIONS

Rakesh Agrawal, Peter Haas, Jerry Kiernan, Jul. 10, 2003, "Watermarking relational data: framework, algorithms and analysis", VLDB Journal 12, pp. 157-169.*
Tom Kyte, Aug. 21, 2003, "Effective Oracle by Design", McGraw-Hill Osborne Media, p. 28.*
Thierry Pun et al, "Hybrid Robust Watermarking Resistant Against Copy Attack", 2003.*
w3Schools.com, "SQL Order by", 2000, available online: http://web.archive.org/web/20010111074700/http://www.w3schools.com/sql/sql_orderby.asp.*
Ling et al, "New Real-Time Watermarking Algorithm for Compressed Video in VLC Domain", Oct. 2004.*

\* cited by examiner

*Primary Examiner*—Mohammad Ali
*Assistant Examiner*—Brannon W Smith
(74) *Attorney, Agent, or Firm*—David G. Grossman; Esmael Dinan

(57) ABSTRACT

Disclosed is a fragile watermarking scheme for detecting and localizing malicious alterations made to a database relation with categorical attributes without introducing distortions to cover data. A watermark for a tuple group may be inserted by selectively switching the position of tuples in tuple pairs using a tuple hash associated with each tuple in the tuple pair; and a corresponding bit in a watermark derived from the tuple group using a embedding key, a primary key and hash functions.

18 Claims, 13 Drawing Sheets

| i | $h_i$ |
|---|---|
| 1 | 1009 |
| 2 | 2001 |
| 3 | 1005 |
| 4 | 4310 |
| 5 | 1000 |
| 6 | 2357 |
| 7 | 2100 |
| 8 | 1111 |
| 9 | 3294 |
| 10 | 3000 |

| i | $h_i$ |
|---|---|
| 1 | 1005 |
| 2 | 2001 |
| 3 | 1009 |
| 4 | 4310 |
| 5 | 1000 |
| 6 | 1111 |
| 7 | 2100 |
| 8 | 2357 |
| 9 | 3294 |
| 10 | 3000 |

FIG. 3

510 extract the embedded watermark from the tuples in the tuple group, the embedded watermark comprising at least one watermark bit, each watermark bit associated with a tuple pair is a "1" if the tuple hash of the first tuple in the tuple pair is larger than the tuple hash of the second tuple in the tuple pair.

520 verify at least one tuple group by checking the watermark with the embedded watermark

FIG. 5

FRAGILE WATERMARKS

CROSS-REFERENCE TO RELATED APPLICATIONS

This application claims the benefit of U.S. Provisional Application No. 60/619,040, filed Oct. 18, 2004, entitled "Tamper Detection and Localization for Categorical Data Using Fragile Watermarks," which is hereby incorporated by reference in its entirety.

STATEMENT REGARDING FEDERALLY SPONSORED RESEARCH OR DEVELOPMENT

The U.S. government has a paid-up license in this invention and the right in limited circumstances to require the patent owner to license others on reasonable terms as provided for by the terms of Grants No. CCR-0113515 and IIS-0242237 awarded by the National Science Foundation.

BACKGROUND OF THE INVENTION

The security of digital data has been a great concern since the expanded use of these data over the Internet. Because digital data allow unlimited number of copies of an "original" without any quality loss and can also be easily distributed and forged, this presents problems of copyright protection and tamper detection, creating a pressing need for digital data protection schemes.

A number of technologies have been developed to provide data protection including cryptography and steganography. Cryptography protects data by encrypting them so that the encrypted data are meaningless to an attacker. However, once the encrypted data are decrypted, the data are in the clear and are no longer under protection. On the other hand, steganography conceals the very existence of the data by hiding them in cover data. The problem is that it cannot extract the hidden data if the stego data undergo some distortions.

A new emerging technology, digital watermarking, complements cryptography and steganography by embedding an invisible signal directly into the data, thus providing a promising way to protect digital data from illicit copying and manipulation. After embedding, the watermark and the data are inseparable. There is a wide range of applications of digital watermarking including copyright protection, authentication, fingerprinting, copy control, and broadcast monitoring, etc. For different kinds of applications, digital watermarking should satisfy different properties. The tamper detection problem is of particular interest. For this kind of application, digital watermarking should have properties such as invisibility, fragility, high detection reliability, etc.

Digital watermarks may be classified into two categories based on their application: fragile watermarks for tamper detection and robust watermarks for ownership verification. In the last few years, research on fragile watermarking for multimedia data, such as images, audio, and video has been extensively conducted. Recently, some researchers began to realize the importance of watermarking databases and proposed some robust watermarking schemes designed to protect the copyright of a database relation. Though it may be important to verify the source or owner of a database relation, in some cases, it may also be critical to ensure the authenticity of database relations. This is of increasing interest in many applications where database relations are publicly available on the Internet. For example, in the application of database outsourcing, owners of databases, who do not have sufficient resources to maintain the applications, store their databases on servers provided by external application service providers so that the owners can focus on their own core tasks. The application service providers may provide data processing service to clients on behalf of the owners. Since service providers may not be trusted, the database owners may need to take responsibility for ensuring the integrity of outsourced databases. Similar applications include edge computing and data dissemination etc.

Unfortunately, despite the importance of tamper detection for database relations, this problem has not been adequately addressed. Although some digital signature based schemes have been proposed to address this problem, they can only detect, but not localize, the modifications. Thus, like fragile watermarking for multimedia data, it is desirable to have a fragile watermarking scheme for database relations, so that any modifications made to a database relation can be not only detected but localized as well. This is especially useful for a very large database relation where the rest of the relation can still be trusted and used after some tampered tuples are detected and localized.

Embedding watermarks in database relations is a challenging problem because there is little redundancy present in a database relation. One important property of digital watermarks is invisibility. Usually, in a watermarking scheme, a watermark is embedded by "slightly" modifying the cover data. To ensure invisibility, the modifications are limited to some acceptable level. This requires that the cover data can tolerate these modifications. In the context of multimedia data, this requirement is not a problem. Since multimedia data are highly correlated, there is a lot of redundant information present in multimedia data. Although compression techniques can remove some of the redundant information, currently, no compression technique is perfect enough to remove all the redundant information. This leaves room for watermark embedding. A watermark can be embedded as a part of the redundant information without affecting the quality of the multimedia data. Furthermore, some properties of the human vision (auditory) system can be incorporated to the watermark embedding so that the strength of the embedded watermark can be adjusted adaptively. All of these make it easy to ensure invisibility for multimedia watermarking. In contrast, database relations contain large number of independent tuples. A tuple can be added, deleted, or modified without affecting other tuples. All tuples and all attributes are equally important. There is little redundancy present in the tuples. Thus, it is a challenge to embed an invisible watermark in a database relation.

In current robust database watermarking schemes, there is an assumption that all watermarked attributes are numeric and can tolerate small distortions. Although this assumption is reasonable for some kinds of database relations such as weather and measurement databases, in real life, we also need to deal with database relations which contain categorical attributes such as social security number, name, date of birth, etc. Obviously, these attributes cannot tolerate any modifications.

To the best of our knowledge, the only effort on watermarking categorical data is by Sion. (See R. Sion. Proving ownership over categorical data. In Proceedings of ICDE 2004, 2004). In his scheme, although only a small number of tuples are selected for watermark embedding, the categorical values of the selected tuples are modified to embed a watermark. Such modifications may be too significant to be tolerable. Besides, the Sion scheme is a robust watermarking scheme and is designed to protect the copyright of a database relation. A fragile watermarking scheme for categorical data is yet to be devised.

What is needed is a fragile watermarking scheme for detecting and localizing malicious alterations made to a database relation with categorical attributes without introducing distortions to cover data.

BRIEF DESCRIPTION OF THE SEVERAL VIEWS OF THE DRAWING(S)

The accompanying drawings, which are incorporated in and form a part of the specification, illustrate an embodiment of the present invention and, together with the description, serve to explain the principles of the invention.

FIG. 3 is an illustration of an exemplary watermark embedding for a small table which only has 10 tuples as per an aspect of an embodiment of the present invention.

FIG. 5 is a flow diagram of an aspect of an embodiment of the present invention.

DETAILED DESCRIPTION OF THE INVENTION

Figure 1:
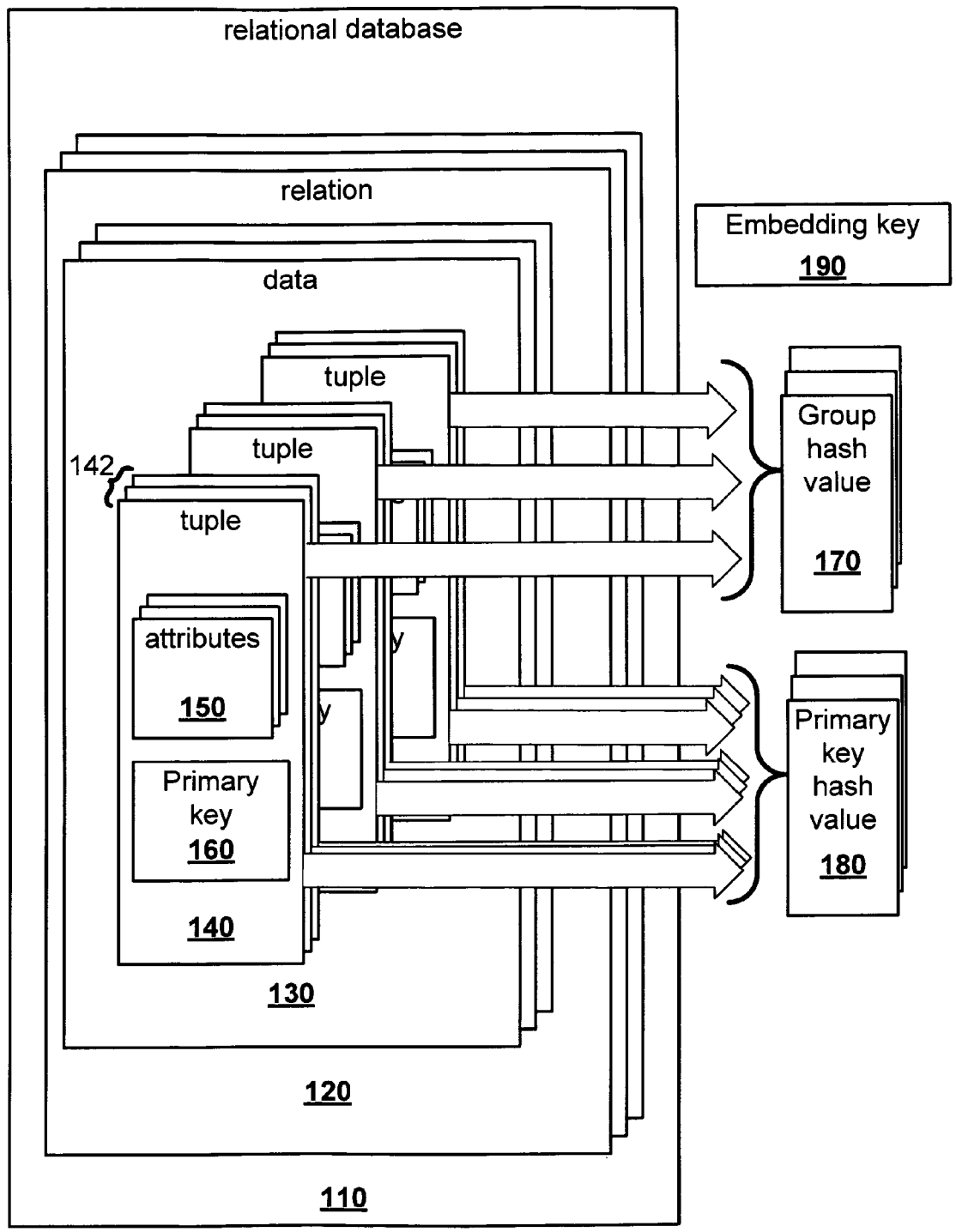
FIG. 1 is a block diagram of an exemplary relational database that could be processed by an aspect of an embodiment of the present invention.

Throughout this description, the preferred embodiment and examples shown should be considered as exemplars, rather than as limitations on the present invention. The present invention is a fragile watermarking scheme for detecting and localizing malicious alterations made to a database relation with categorical attributes without introducing distortions to cover data. According to the present invention, tuples in a database relation are securely divided into groups according to some secure parameters. Watermark(s) are embedded and verified in each group independently. Thus, modifications may be localized to specific groups. Security analysis shows that the probability of missing detection is very low.

Related Work

Recently, database watermarking has begun to receive attention. Watermarking schemes for databases that assumed that attributes are numeric and can tolerate modifications of some least significant bits were introduced. In some of these schemes, tuples are first selected for watermark embedding. Then some bits of some attributes of the selected tuples are modified to embed watermark bits. The selection of tuples, attributes, and bit positions are governed by a secret embedding key. These schemes are claimed to be robust against a wide range of attacks including rounding attack, subset attack, and additive attack etc. Since the watermark detector can only determine whether the related watermark is embedded or not, actually one bit information is embedded. Li et al. further extends this scheme to a fingerprinting scheme where multiple bits of information can be embedded. (See Y. Li, V. Swarup, and S. Jajodia; A robust watermarking scheme for relational data, In Proc. The 13th workshop on information technology and engineering, pages 195-200, December 2003). Thus, a distinct watermark can be embedded to each copy of a database relation so that potential illegal distributors can be tracked if unauthorized copies are found later.

Sion et al. present a different approach to robust watermarking scheme for databases. (See R. Sion, M. Atallah, and S. Prabhakar, Rights protection for relational data, In Proceedings of ACM SIGMOD 2003, 2003). Sion's scheme is subset based where all tuples are securely divided into non-intersecting subsets. A single watermark bit is embedded into tuples of a subset by modifying the distribution of tuple values. The same watermark bit is embedded repeatedly across several subsets and the majority voting technique is employed to recover the embedded bits. In addition to the subset attack, this scheme is claimed to be robust against other attacks such as data resorting and data transformation. However, the scheme is not suitable for database relations that need frequent updates, since it is very expensive to re-watermark the updated database relations.

In the aforementioned watermarking schemes, attributes are assumed to be numeric and can tolerate small modifications, and watermarks are embedded by modifying attribute values. In an article antitled "Proving ownership over categorical data" in the Proceedings of ICDE 2004, Sion proposed a robust watermarking scheme for categorical data. In this scheme, some tuples are first selected according to a secret key. Then, the categorical attributes of selected tuples are changed to other values in the set of possible categorical attribute values based on the embedded watermark. For example, the color of a product may be changed from red to green. Though only a small part of selected tuples are affected by the watermarking embedding, the modifications of categorical attributes in certain applications may be too significant to be acceptable.

Overview of the Present Invention

The present invention is related to detecting alterations in relational databases. Specifically, the present invention uses fragile watermarks for detecting and localizing malicious alterations made to a database relation with categorical attributes without introducing distortions to cover data.

Figure 2:
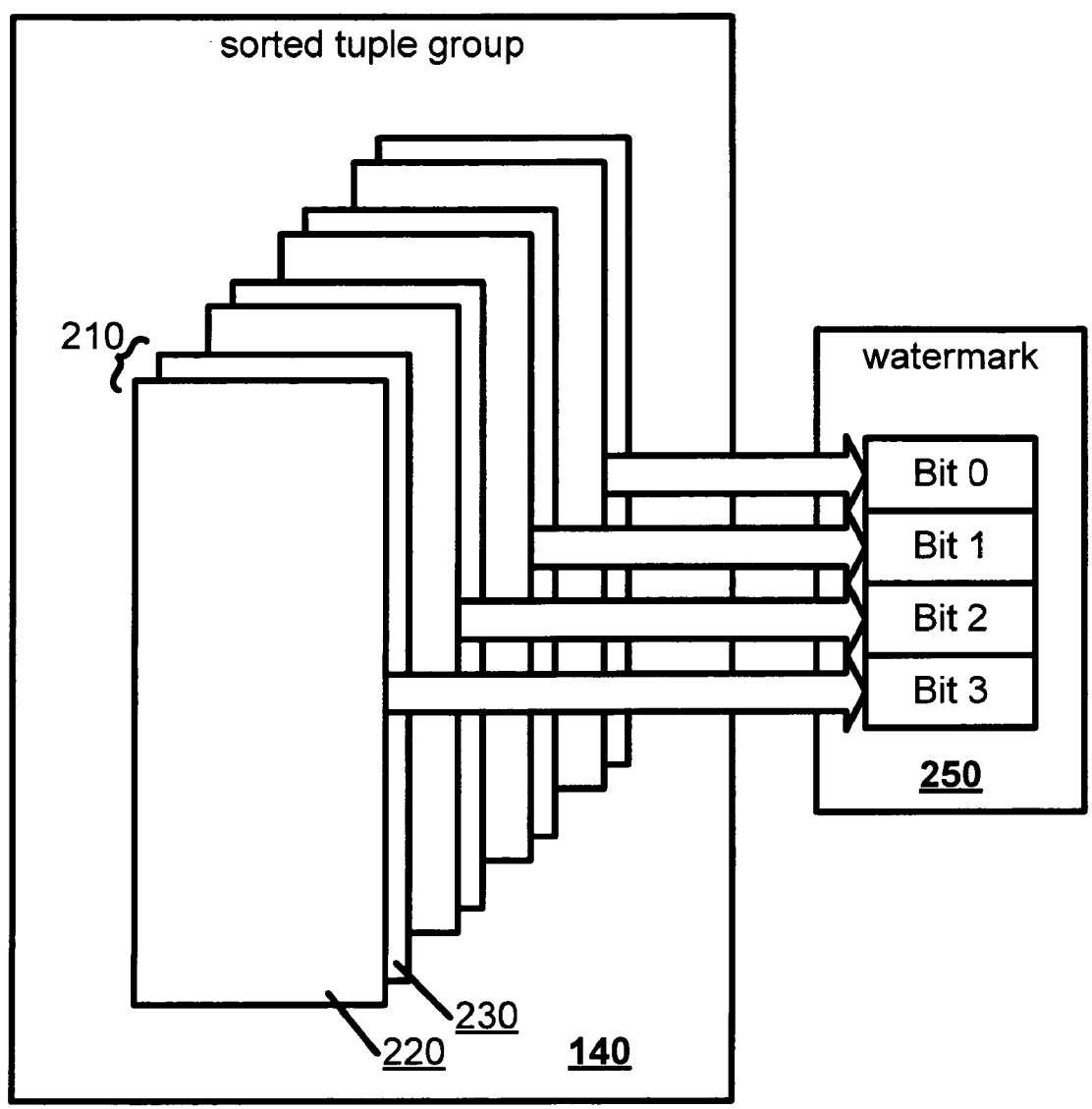
FIG. 2 is a block diagram of a sorted tuple group and an associated watermark as per an aspect of an embodiment of the present invention.
Figure 4:
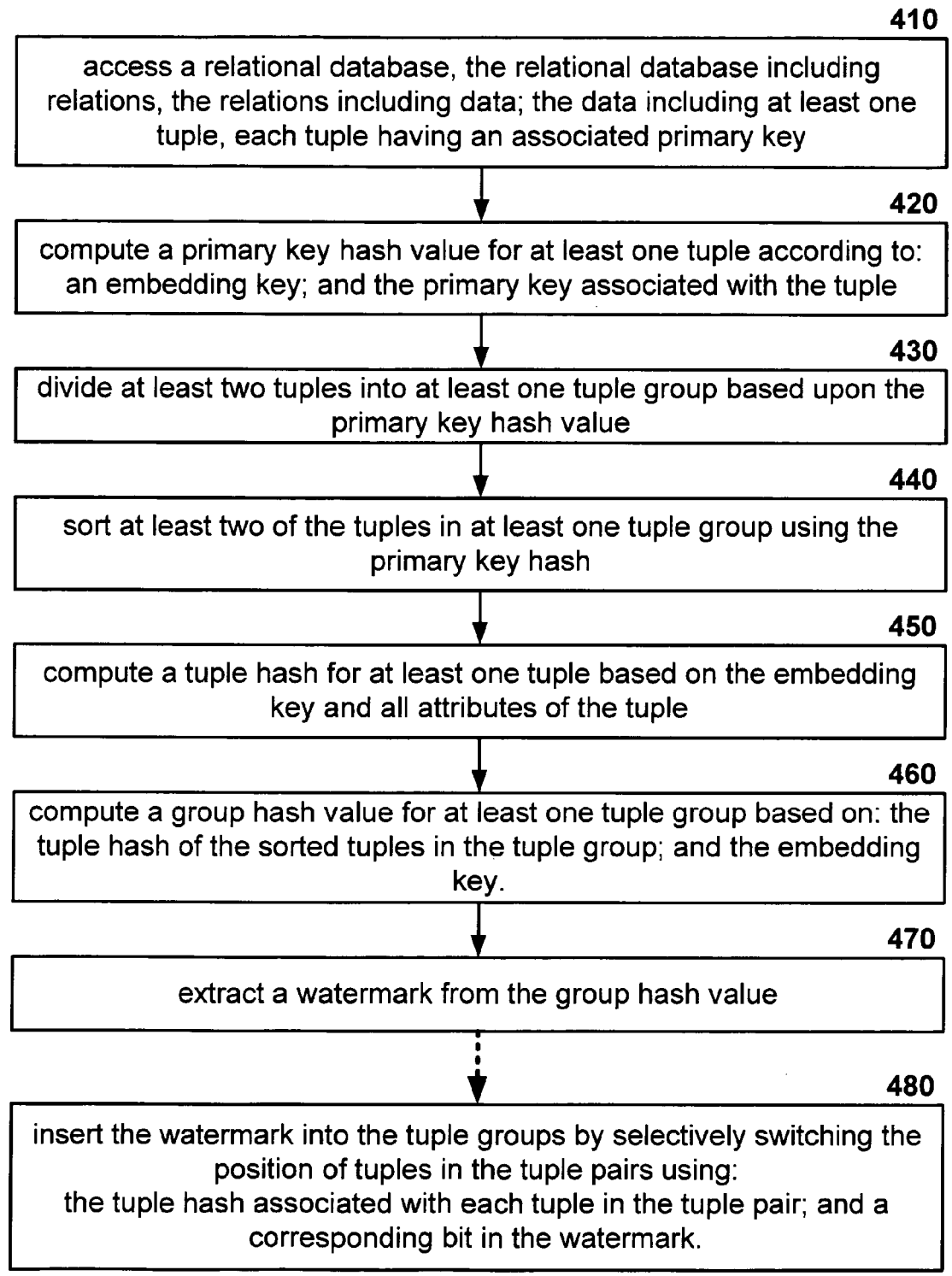
FIG. 4 is a flow diagram of an aspect of an embodiment of the present invention.

The remainder of this overview will refer to FIGS. 1, 2, 4, and 5. FIG. 1 is a block diagram of an exemplary relational database that could be processed by an aspect of an embodiment of the present invention. FIG. 2 is a block diagram of a sorted tuple group and an associated watermark. FIGS. 4 and 5 are flow diagrams of different aspects of the present invention. These figures are illustrative only, and only represent aspects of particular embodiments of the present invention. Therefore, they should not be viewed as limiting the scope of equivalence of other embodiments of this invention, either in whole or in part.

One embodiment of the present invention is a tangible computer-readable medium encoded with instructions, wherein execution of the instructions by one or more processors causes the "one or more processors" to perform a series of steps. A first step 410 involves accessing a relational database. FIG. 1 is a block diagram of an exemplary relational database 110 that could be accessed using the present invention. As shown, the database preferably includes relational database relations 120, the relations 120 may include data 130; and the data 130 may include at least one tuple 140. Each tuple 140 preferably has an associated primary key 160.

A database relation 120 may be a predefined row/column format for storing information in a relational database. Relations 120 are generally equivalent to tables. In a preferred embodiment, data 130 is categorical data.

A tuple 140 is a collection of one or more attributes 150, 160. Other ways of describing a tuple 140 include a data object that holds several objects or a function that maps field names to values. Attributes 150 may be encoded as integers. When an attribute 150 is a string attribute comprising at least one character, the string attribute may be encoded as the concatenation of the ASCII code of each character in the string attribute.

In general, a primary key 160 identifies records in a table. Primary keys 160 may consist of a single attribute or multiple attributes in combination. The primary key in the present invention is used for computing the primary key hash which is for grouping and sorting tuples.

A second step 420 includes computing a primary key hash value 180 for at least one tuple according to: an embedding key 190; and the primary key 160 associated with the tuple 140. A primary key hash value 180 may be calculated using a hash function. A hash function is a function that may associate data with an identifier. Examples of hash functions include: the PJW Hash Function by Peter J. Weinberger of AT&T Bell Labs; BKDR Hash Function disclosed in "The C Programming Language" by Brian Kernighan and Dennis Ritchie's book; the SDBM Hash Function used in the open source SDBM project; and the DEK Hash Function by Donald E. Knuth and disclosed in "The Art Of Computer Programming" Volume 3. An embedding key 190 is preferably kept secret and is used to select tuples, attributes, and bit positions.

A third step 430 is to divide at least two tuples 140 into at least one tuple group 142 based upon the primary key hash value 180. A fourth step 440 is to sort at least two of the tuples 140 in at least one tuple group 142 using a primary key hash.

A watermark 250 may be extracted from a tuple group 142. To do this, a tuple hash may be computed at step 450 for a tuple based on the embedding key 190 and preferably all attributes of the tuple 140. At step 460, a group hash value 170 for at least one tuple group 142 may be computed based on: the tuple hash of the sorted tuples in the tuple group 142 and the embedding key 190. Now, at step 470, a watermark 250 may be extracted from the group hash value 170.

Tuple groups 140 may be independently watermarked at step 480 by inserting the watermark 250 for a tuple group 142 into the tuple group 142. This may be performed by selectively switching the position of tuples 220 and 230 in the tuple pair(s) 210 using: the tuple hash associated with each tuple 140 in the tuple pair; and a corresponding bit in the watermark 250.

Tuple groups may be verified by checking the watermark with an embedded watermark at step 520. To do this, an embedded watermark may extracted from the tuples 140 in the tuple group 142 at step 510. The tuples 140 in the tuple group 142 are preferably paired into at least one tuple pair 210, where each tuple pair 210 comprising a first tuple 220 and a second tuple 230. The embedded watermark 250 comprising watermark bit(s), where each watermark bit is associated with a tuple pair. In this embodiment, the length of the watermark is equal to the number of tuple pairs in a tuple group 140. The watermark bit associated with each tuple pair is a "1" if the tuple hash of the first tuple in the tuple pair is larger than the tuple hash of the second tuple in the tuple pair. Otherwise, the watermark bit is a "0".

Several (or all) of the tuple groups 140 may be verified independently (by comparing the watermark for each tuple group with the embedded watermark for each tuple group). This should now enable the identification of where (to the level of a tuple group) the relational database is corrupted.

Design Purpose

For different applications, the design purposes of watermarking schemes are different. In a robust watermarking scheme for ownership verification, an attacker often attempts to remove the embedded watermark or make it undetectable while keeping the database relation useful. Thus, the design purpose is to make the embedded watermark robust against malicious attacks. In contrast, the present invention is a fragile watermarking scheme for tamper detection. In this kind of scheme, an attacker may try her best to make modifications to a database relation while keeping the embedded watermarks untouched. The attack is successful if the database relation is modified while the embedded watermarks are still detectable. Thus, in the present invention, the embedded watermarks are designed to be fragile so as to detect any modifications made to a database relation. If there are some alterations, the embedded watermarks should not be detectable. Furthermore, since the present invention is primarily designed for categorical data that cannot tolerate distortion, the watermark embedding should be distortion free. In short, the fragile watermark for categorical data should preferably have the following properties:

Invisibility: In a watermarking scheme for categorical data, the embedded watermark should not introduce any distortions to the categorical data, since even a minor modification will render the categorical data useless.

Prevent illegal embedding and verification: The whole watermarking process is governed by a key. Only an authorized person who has a key can embed, extract, and verify watermarks. This prevents unauthorized persons from inserting a false watermark or illegally verifying watermarks.

Blind verification: The original unmarked database relation should not be required for watermark verification.

The extracted watermark indicates the locations of alterations: In case of modifications, the embedded watermarks should indicate where the modifications are or at least narrow down the modifications to a range of tuples.

Watermark Embedding

A very important problem in a watermarking scheme is synchronization, that is, one should ensure that the watermark extracted is in the same order as that embedded. If synchronization is lost, even if no modifications have been made, the embedded watermark may not be correctly verified. In a fragile watermarking scheme for multimedia data, synchronization is not a problem, since the relative position of multimedia data is fixed. In contrast, tuples in a database relation are independent and can be put in an arbitrary order. On the one hand, this particular property makes fragile watermarking for categorical data a challenge. On the other hand, this property may be used to devise a novel approach to database watermarking through manipulating the order of tuples. The advantage of this approach is that the attributes will not be modified by watermark embedding, which makes it an ideal solution to watermarking categorical data. The present invention is based on this idea.

The following notations and parameters are used in this disclosure:

γ number of attributes in the relation
ω number of tuples in the relation
g number of groups in the table
v average number of tuples in a group
$h_i^p$ primary key hash of the $i^{th}$ tuple in a group
$h_i$ tuple hash of the $i^{th}$ tuple in a group
H group hash
$G_k$ the $k^{th}$ group
$r_i.A_j$ the $j^{th}$ attribute of the $i^{th}$ tuple in a group
K watermark embedding key
W watermark embedded in a group
W' watermark extracted in a group
V watermark verification result for W Suppose there is a database relation which has a primary key P and γ attributes, denoted by $T(P, A_1, A_2, \ldots, A_\gamma)$. Algorithms 1 and 2 describe the watermark embedding algorithm. First, a secure primary key hash value is computed for each tuple according to an embedding key and the primary key for the tuple. Based on the primary key hash value, all tuples may then be securely divided into g groups. The grouping is only a virtual operation which means that it does not change the physical position of the tuples. After grouping, all tuples in each group are preferably sorted according to their primary key hash. Like grouping, the sorting operation does not change the physical position of tuples. Each group may then be watermarked independently.

| Algorithm 1: Watermark embedding |
| --- |
| 1:      For all k∈ [1,g] $q_k$ =0 |
| 2:      for i=1 to ω do |
| 3:          $h_i$ =HASH(K,$r_i.A_1,r_i.A_2,\ldots,r_i.A_\gamma$) // tuple hash |
| 4:          $h_i^p$ =HASH(K,$r_i$.P) // primary key hash |
| 5:          k =$h_i^p$ mod g |
| 6:          $r_i$ →$G_k$ |
| 7:          $q_k$++ |
| 8:      end for |
| 9:      for k = 1 to g do |
| 10:          watermark embedding in $G_k$ // See algorithm 2 |
| 11:      end for |

Algorithm 2 shows the detailed embedding process. Before embedding, a secure tuple hash is preferably computed for each tuple based on the embedding key and all attributes of the tuple. Since the attributes can be of any type, each attribute may be encoded to an integer. For example, a string attribute may be encoded as the concatenation of the ASCII code of each character (such as a letter) in the string. A group hash value may then be computed based on the tuple hash of sorted tuples in the group and the embedding key. A watermark, the length of which is equal to the number of tuple pairs in the group, may be extracted from the group hash value. That is, some selected bits from the group hash value are put together to form a watermark. To embed the watermark, for each tuple pair, the order of the two tuples may be changed or unchanged according to their tuple hash values and the corresponding watermark bit. Accordingly, since only the order of tuples is changed, the watermark embedded is distortion free.

| Algorithm 2: Watermark embedding in $G_k$ |
| --- |
| 1:     sort tuples in $G_k$ in ascendant order according to their primary key hash // Virtual operation |
| 2:     H = HASH(K,$h_1',h_2',\ldots,h_{qk}'$)) // $h_i'$(i = 1,...$q_k$) is the tuple hash of $i^{th}$ tuple after ordering |
| 3:     W = extractBits(H,$q_k$/2) // See line 9 – 16 |
| 4:     for i=1,i<$q_k$,i=i+2 do |
| 5:         if (W[i/2]==1 and $h_i$<$h_{i+1}$) or (W[i/2]==0 and $h_i$ > $h_{i+1}$) then |
| 6:            switch the position of $r_i$ and $r_{i+1}$ |
| 7:         end if |
| 8:     end for |
| 9:     extractBits(H,k) { |
| 10:        if length ( H ) ≧l then |
| 11:           W = concatenation of first l selected bits from H |
| 12:        else |
| 13:           m=l-length(H) |
| 14:           W =concatenation of first l selected bits from (H,l) |
| 15:        end if |
| 16:     return W       } |

This is different from all other watermarking schemes which embed watermarks by introducing small distortions to the cover data. Since watermarking embedding is group based, any modifications made to the database relation can be detected and localized to some specific groups. Here, grouping and sorting are two very important operations in the scheme. They indeed enforce some relationship between tuples so that the embedded watermarks and the extracted watermarks can be synchronized.

FIG. 3 illustrates an example of watermark embedding for a small table which only has 10 tuples. The table on the left is the original un-watermarked table. For simplicity, we only show a hypothetical hash value, not the real value, for each tuple. Suppose all tuples are divided into two groups: all shaded tuples belong to the first group where a watermark {01} is embedded; the remaining tuples compose the second group where a watermark {101} is embedded. To embed the watermark into the group 1, take the tuple pair {1009, 1005}. Since first watermark bit is zero 0 and the first tuple hash is larger than the second one, the two tuples are switched. The other two tuples in the second pair remain untouched because a watermark bit 1 is embedded and the first tuple hash is already larger than the second one. Similarly, the second group is watermarked and the watermarked table is shown on the right.

Watermark Detection

Algorithms 3 and 4 describe the watermark detection algorithm as per an aspect of an embodiment of the present invention. To verify the integrity of a database relation, K and g need to know. As in watermark embedding, the secure primary key hash is preferably computed for each tuple and all tuples are divided into groups and each group may be verified independently. In a group, the tuples are first sorted according to their primary key hash. Like watermark embedding, the sorting is a virtual operation and does not involve order change of any tuples. Based on the tuple hash of the sorted tuples and the secret embedding key, a group hash value may be computed and a watermark W is extracted accordingly. W is the watermark that is supposed to be embedded. Then, the watermarking W' that is actually embedded is extracted from the tuples. For every tuple pair, if tuple hash of the first tuple is larger than that of the second one, the related watermark bit is one; otherwise, it is zero. After W' is extracted, it is checked against W. If the two match, the tuples in the group are authentic; otherwise, they are not.

| Algorithm 3: Watermark detection |
| --- |
| 1:     For all k∈[1,g]$q_k$ = 0 |
| 2:     for i=1 to ω do |
| 3:         $h_i$ = HASH(K,$r_i.A_1,r_i.A_2,...,r_i.A_v$) // tuple hash |
| 4:         $h_i^p$ = HASH(K,$r_i$.P) // primary key hash |
| 5:         k = $h_i^p$ mod g |
| 6:         $r_i \to G_k$ |
| 7:         $q_k$++ |
| 8:     end for |
| 9:     for k = 1 to g do |
| 10:         watermark embedding in $G_k$ // See algorithm 4 |
| 11:    end for |

| Algorithm 4: Watermark verification in $G_k$ |
| --- |
| 1:    sort tuples in $G_k$ in ascendant order according to their primary key hash // Virtual operation |
| 2:    H = HASH(K,$h_1',h_2',...,h_{qk}$)) // $h_i'$(i=1,...$q_k$) is the tuple hash of $i^{th}$ tuple after ordering |
| 3:    W =extractBits(H,$q_k$/2) // See line 9 – 16 in Algorithm 2 |
| 4:    for i=1,i<$q_k$,i=i+2 do |
| 5:       if $h_i \leq h_{i+1}$ then |
| 6:         W'[i/2]=0 |
| 7:       else |
| 8:         W'[i/2]=1 |
| 7:       end if |
| 8:    end for |
| 9:    if W'==W then |
| 10:       v=TRUE |
| 11:    else |
| 12:       v=FALSE |
| 15:    end if |

Embedding Capacity

In the proposed scheme, since each tuple pair can only embed one watermark bit, the length of the watermark in each group is v/2. As will be seen, the longer a watermark, the more secure is the scheme. To increase the embedding capacity, one solution is to re-divide the tuples in a group to sub-groups. Suppose the number of subgroups is s, then the average number of tuples in a sub-group is m(m=v/s). In each sub-group, the number of all possible combinations of m tuples is m!. To represent these combinations, $\log_2$ m! bits are needed. Thus, by manipulating the order of tuples in the sub-groups, maximum s·$\log_2$ m! watermark bits may be embedded in a group. Actually, the proposed scheme disclosed earlier is the special case of m=2. The embedding capacity and complexity is minimum in this case. If the whole group is viewed as a sub-group (s=1, m=v), the maximum embedding capacity of $\log_2$ v! may be achieved. Of course, this may also maximize the complexity of the watermark embedding and detection. For a specific order arrangement of the tuples, it may be time consuming to decide the related watermark bits. Thus, trade-offs may need to be made between security and complexity.

Threat Model

The present invention is designed to detect the following malicious modifications: modification of one or multiple attribute values, insertion of one or more tuples, and deletion of one or multiple tuples. The objective of an attacker is usually to modify the tuples in such a way that his modifications are undetectable. Analysis shows that these kinds of modifications may be detected with high probability.

The present scheme distributes tuples evenly in groups due to the property of the hash function. The relative order of tuples represents the embedded watermarks. What if the order is changed inadvertently? It is likely that such a change will not change the relative position of tuples in one or two groups. In this case, the embedded watermark is not affected and may still be correctly verified.

For example, in FIG. 3, if the tuples 1005 and 2001 in the watermarked table (the one on the right) are switched, this should not affect the embedded watermark since their relative positions remain the same.

However, in other cases, even if the order of tuples is changed without any modifications of tuple values, the embedded watermark may be affected and may not be correctly verified. For example, if order of the tuples 1009 and 4310 is changed, it will disrupt the embedded watermark. Here, the order change will be treated as malicious modifications. This is acceptable since this scheme is mainly designed to detect modifications; it is more important that any malicious modifications can be detected with high probability. In some applications, the owner may need to change the order of the tuples frequently. For example, he may need to sort the database relation frequently according to different attributes. In this case, the owner can build an index table which records the initial order of the tuples in the database. After that, the tuples may be sorted arbitrarily. When it is needed to verify the integrity of the database relation, the index table is first used to recover the initial order of the tuples and the embedded watermarks can then be verified as usual.

For Databases Without a Primary Key

In the proposed scheme, it is assumed that the database to be protected has a primary key. The primary key is used for computing the primary key hash which is for grouping and sorting tuples. In this way, if an attacker modifies an attribute value other than the primary key of a tuple, this modification only affects the watermark embedded in one group. For database relations without a primary key, a tuple hash can be used to group and sort tuples. In this case, the modification of an attribute value will affect the watermarks in two groups, since the modified tuple may be removed from one group and be added to the other group.

Analysis

This fragile watermarking scheme is group based; the order of tuples in each group may represent a unique watermark. Therefore, the finest granularity that one can localize possible alterations in is a group. In this section, the probability that all alterations are correctly localized in corresponding groups is analyzed. Considered are three simple alterations: modifying an attribute value, inserting a tuple, and deleting a tuple. Also considered are three massive alterations: modifying multiple attribute values, inserting multiple tuples, and deleting multiple tuples. For simplicity, an assumption is made that each group consists of exactly v tuples; thus, the length of each embedded watermark W is v/2. If v is not even, the last tuple may contribute a half bit in watermark detection.

Given an ideal hash function HASH with an input and an output, any tamper of the input will preferably randomize the output; that is, each bit of the output has equal probabilities to change or not after the modification. This ideal hash is being used for illustrative purposes in the following analysis. However, one skilled in the art will recognize that other functions may be used.

Modify an Attribute Value

Suppose a single attribute value is modified in the watermarked relation. If the modified value is not from the primary key attribute, the modification will affect neither the primary key hash nor the partition of groups in watermark verification. Without loss of generality, assume $r_i.A_j$ is modified (i.e., the j-th attribute of the i-th tuple) in a group. The modification will affect the tuple hash $h_i$, the group hash H, and thus the embedded watermark W. After the modification, each bit of W has equal probabilities to match corresponding bit of W', which is the watermark extracted from the group. Therefore, the probability that the modification can be correctly detected (i.e., W≠W') is $$Prob = 1 - \frac{1}{2^{\frac{v}{2}}} \quad (1)$$

Now consider the case that the modified value is a primary key value $r_i.P$. Since the modification affects the primary key hash $h_i^P$ in a random way due to this hash model, tuple $r_i$ has probability 1/g to remain in the same group, and probability 1−1/g to change to one of the other groups after the modification. In the latter case two groups are affected by the modification. The probability that the modification can be correctly detected (i.e., all affected groups are localized in watermark verification) is $$Prob = \frac{1}{g}\left(1 - \frac{1}{2^{\frac{v}{2}}}\right) + \frac{g-1}{g}\left(1 - \frac{1}{2^{\frac{v-1}{2}}}\right)\left(1 - \frac{1}{2^{\frac{v+1}{2}}}\right) \quad (2)$$

Clearly, the probability in this case is less than that in the case of modifying non-primary-key value. The reason is that the tuple with the modified primary key may move from one group to another and this may affect one more watermark.

Figure 6:
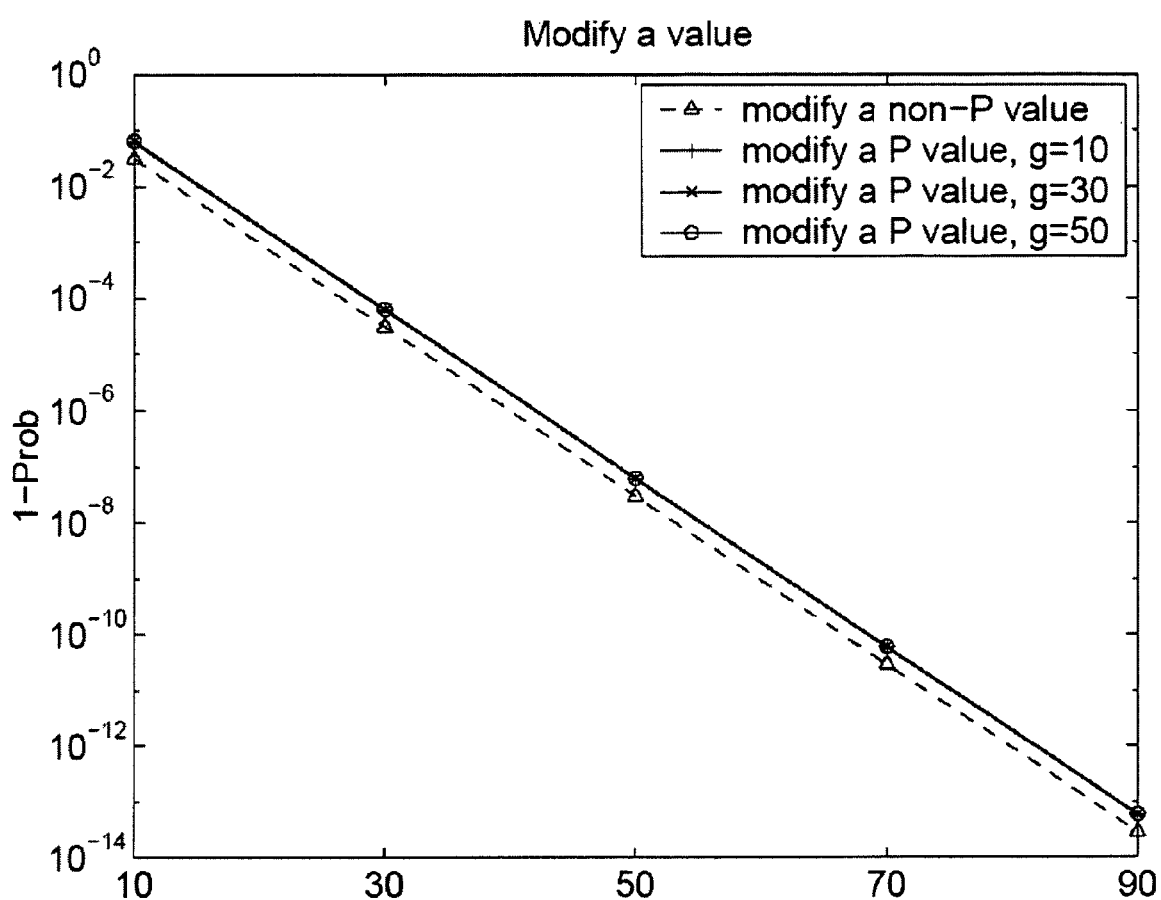
FIG. 6 shows the error rate in detecting a single value modification for different size and numbers of groups an aspect of an embodiment of the present invention.

FIG. 6 shows the error rate (i.e., 1−prob) in detecting single value modification for different size of groups v and number of groups g. It can be seen that the error rates decrease exponentially with the group size v (Y-axis in logarithm scale). It can also be seen that the error rate for non-primary-key value detection, which is irrelevant to the number of groups, is lower than primary key value detection as expected. For non-primary key value detection, the number of groups g has little influence because the second term in formula 2 dominates the detection probability and the coefficient of the term (g−1)/g≈1 for not-too-small g's.

Insert a Tuple

Let a single tuple be inserted into the watermarked relation. The inserted tuple will be allocated to one of g groups in the watermark detection. Since the added tuple will affect the group hash as well as the embedded watermark in a random way, the probability that the insertion can be detected (i.e., the watermark verification result is false for the affected group) is $$Prob = 1 - \frac{1}{2^{\frac{v+1}{2}}} \quad (3)$$

Figure 7:
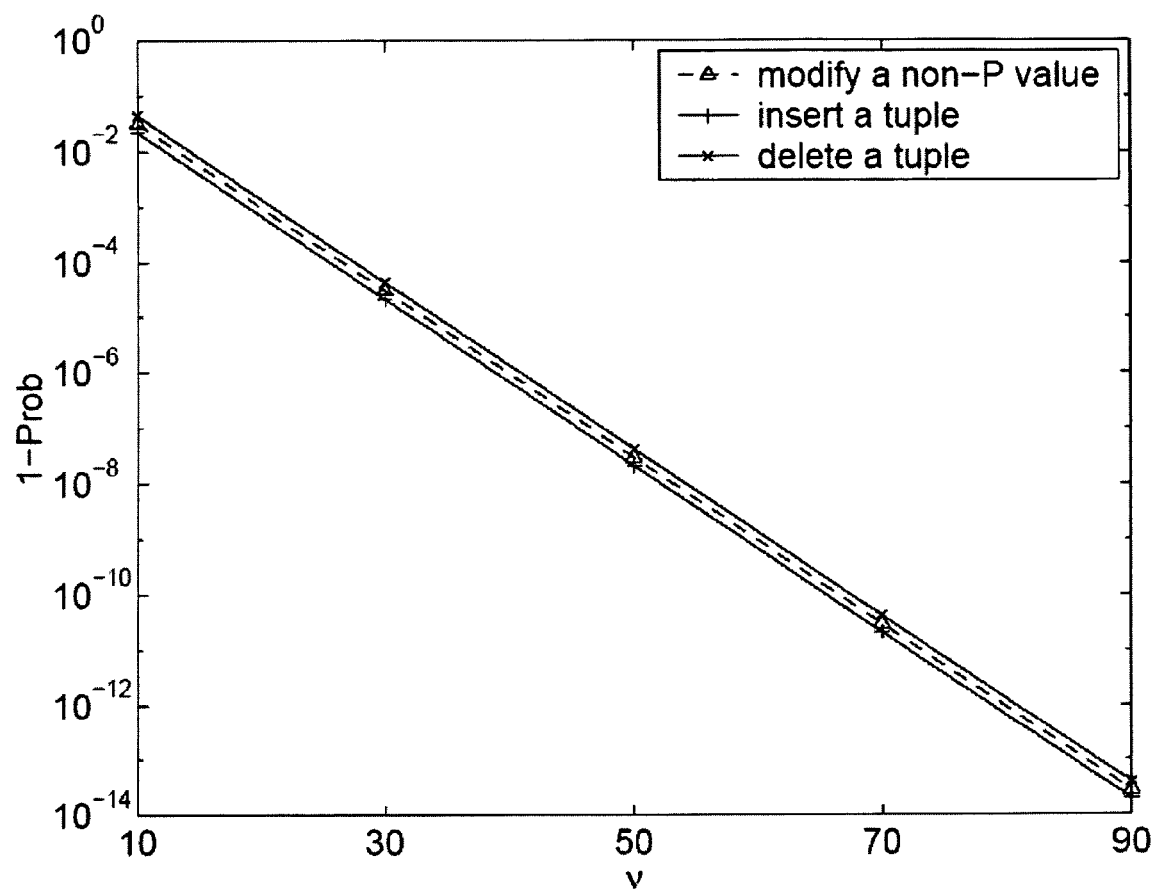
FIG. 7 shows error rates in detecting a single tuple insertions and deletions for an embodiment of the present invention.

FIG. 7 compares the error rate in detecting a single tuple insertion (bottom line in the figure) with detecting a non-primary-key value modification (middle line). Since the tuple insertion increases watermark length, while the modification does not, the error rate for detecting the tuple insertion is lower. In general, the error rate in detecting a longer watermark is always lower than detecting a shorter watermark.

Delete a Tuple

Let a single tuple be deleted from the watermarked relation. Exactly one group will lose the deleted tuple in the watermark detection. The absence of the deleted tuple in the group will affect the group hash as well as the embedded watermark in a random way. The probability that the deletion can be detected (i.e., the watermark verification result is false for the affected group) is $$Prob = 1 - \frac{1}{2^{\frac{v-1}{2}}} \quad (4)$$

FIG. 7 also shows the error rate for detecting single tuple deletion (the upper line in the figure). The error rate is higher than those for detecting value modification and tuple insertion because the tuple deletion decreases the length of watermark.

Modify Multiple Values

First consider the modification of non-primary-key attributes. The modification does not change any primary key hash, neither does the grouping of tuples in watermark detection. Since changing any number of values within a tuple has the same effect (in terms of randomization) on a tuple hash, a group hash as well as an extracted watermark, the modification at the tuple level will now be considered. For convenience, a group with some of its tuples are modified will be called a modify-group.

Assume that n tuples are modified one by one and that at any step, un-modified tuples have equal probability to be modified. The probability that the first tuple is modified in any particular group is v/(gv)=1/g. After i tuples being modified, the probability that the next tuple is modified in a particular group in which k tuples have already been modified, is (v−k)/(gv−i).

Assume that the modification of n tuples will result in m (m≦min(g,n)) modify-groups and that $k_i$+1 (0≦$k_i$<v) tuples are modified in modify-group i (i=1, . . . , m). Given a sequence which indicates which tuple is modified in which group and in which order, one can verify that the probability of the sequence is $$s(k_1, \ldots, k_m) = \frac{[v \cdot (v-1) \cdots (v-k_1)] \cdots [v \cdot (v-1) \cdots (v-k_m)]}{gv \cdots (gv-n+1)} = \quad (5)$$
$$\frac{(v!)^m}{(v-k_1-1)! \cdots (v-k_m-1)!} \cdot \frac{(gv-n)!}{(gv)!}$$

Then the probability that the modification of n tuples will result in m modify-groups is $$p(k_1, \ldots, k_m) = \binom{g}{m} \frac{n!}{(1+k_1)!(1+k_2)! \cdots (1+k_m)!} \cdot s(k_1, \ldots, k_m) \quad (6)$$

where the first term $$\binom{g}{m}$$

is the total number of combinations of m modify-groups selected from g groups, the second term $$\frac{n!}{(1+k_1)!(1+k_2)! \cdots (1+k_m)!}$$

is the number of different sequences (or permutations) of the tuples modified in different delete-groups, and the last term is the probability of any sequence. After the modification, a watermark in any modify-group has v/2 bits. Therefore, the probability that all deletions can be detected is $$Prob = \sum_{m=\lceil n/v \rceil}^{min(g,n)} \sum_{\substack{0 \le k_1,\ldots,k_m < v \\ k_1+\ldots k_m = n-m}} p\langle k_1, \ldots, k_m\rangle \left(1 - \frac{1}{2^{\frac{v}{2}}}\right)^m \quad (7)$$

EXAMPLE 1

Suppose that there are three groups with ten tuples in each group (g=3 and v=10). Suppose n=3 tuples are modified. First consider the case in which the modification results in m=2 modify-groups, where in modify-group 1 two tuples are modified, and in modify-group 2 one tuple is modified ($k_1$=1 and $k_2$=0). The three tuples are modified one by one and a sequence is used to indicate which tuple is modified in which group and in which order. For example, sequence 112 means that the first tuple is modified in modify-group 1, the second in modify-group 1, and the third in modify-group 2. For this sequence, the first tuple is modified with probability 10/30 because there are ten un-modified tuples in modify-group 1 and there are 30 un-modified tuples in total (recall that un-modified tuples have equal probability to be modified). Similarly, the second tuple is modified with probability 9/29, and the third with probability 10/28. The overall probability of the sequence is $$s\langle 1, 0\rangle = \frac{10 \times 9 \times 10}{30 \times 29 \times 28}$$

(see also formula 5). One can verify that there are total $$\frac{n!}{(1+k_1)!(1+k_2)!} = \frac{3!}{2!1!} = 3$$

possible sequences (112, 121, and 211), and that the probability of each of these sequence is the same. Since there are $$\binom{g}{m} = \binom{3}{2} = 3$$

combinations of the two modify-groups selected from three groups, the probability of this considered case is $p\langle 1,0\rangle = 3 \times 3 \times s\langle 1,0\rangle$ (see also formula 6).

Now, formula 7 may be verified by showing that the sum of the probabilities $p\langle \cdot \rangle$ is exactly one. The modification of three tuples will lead to either one or two or three modify-groups. This corresponds to the leftmost sum from m=1 to 3 in formula 7. For the case of two modify-groups (m=2), either one or two tuples are modified in modify-group one; that is, either $k_1$=0, $k_2$=1 or $k_1$=1, $k_2$=0. This corresponds to the second sum in formula 7. This has $p\langle 0,1\rangle = p\langle 1,0\rangle$.

For the case of one modify-group (m=1), three tuples may be modified in a same group ($k_1$=2) with $$s\langle 2\rangle = \frac{10 \times 9 \times 8}{30 \times 29 \times 28}$$

and $$p\langle 2\rangle = \binom{3}{1}\frac{3!}{3!}s\langle 2\rangle.$$

For the case of three modify-groups (m=3), one tuple is modified in each group ($k_1=k_2=k_3$=0), resulting in $$s\langle 0, 0, 0\rangle = \frac{10 \times 10 \times 10}{30 \times 29 \times 28} \text{ and } p\langle 0, 0, 0\rangle = \binom{3}{3}\frac{3!}{1!1!1!}s\langle 0, 0, 0\rangle.$$

Therefore, $$p\langle 2\rangle + p\langle 0, 1\rangle + p\langle 1, 0\rangle + p\langle 0, 0, 0\rangle =$$
$$3 \times \frac{10 \times 9 \times 8}{30 \times 29 \times 28} + 18 \times \frac{10 \times 9 \times 10}{30 \times 29 \times 28} + 6 \times \frac{10 \times 10 \times 10}{30 \times 29 \times 28} = 1.$$

One can verify that when n=1, the probability is the same as that given in earlier. For massive modification where n>g and at least one tuple is modified in each group, the probability can be simplified as:

$$Prob \approx \left(1 - \frac{1}{2^{\frac{v}{2}}}\right)^g \quad (8)$$

Figure 8:
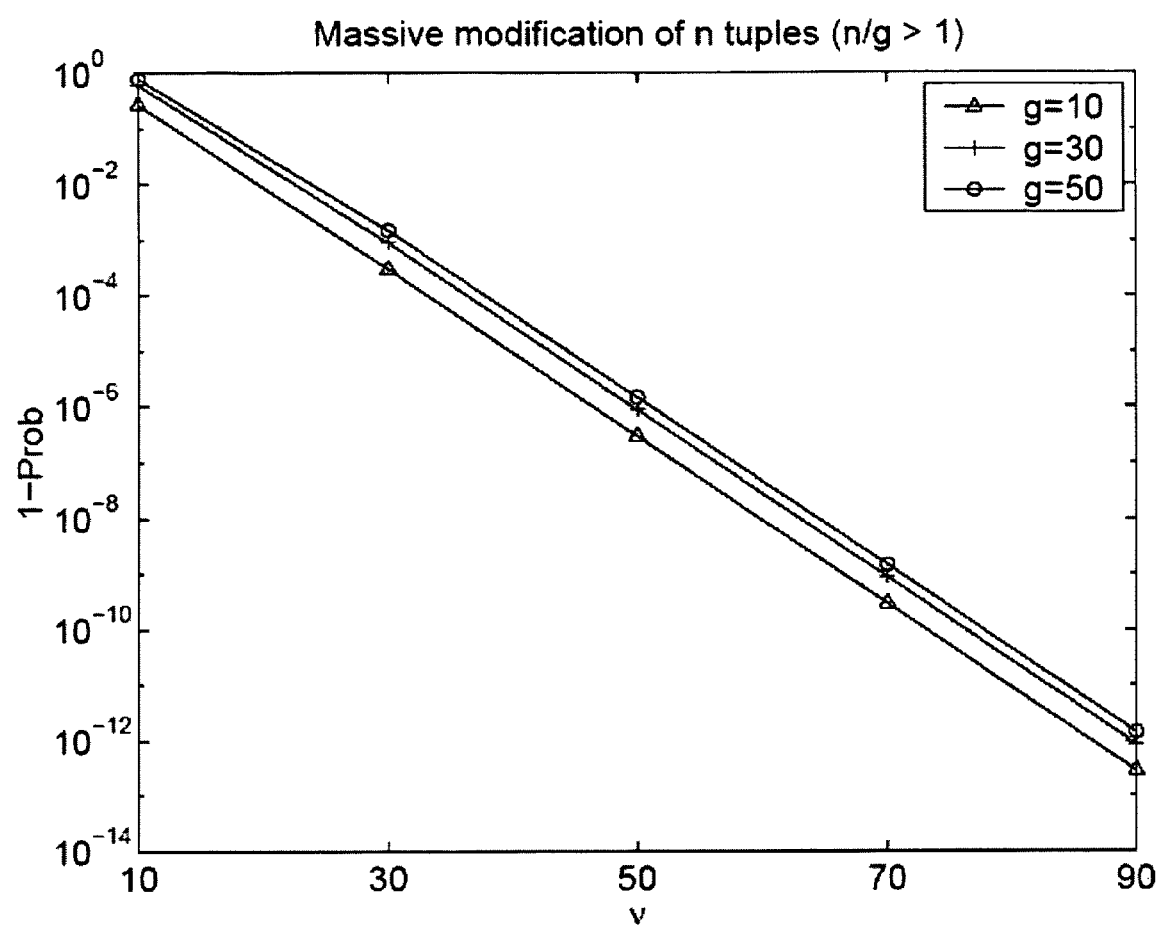
FIG. 8 shows the error rates in detecting massive value modification for different size and number of groups for an embodiment of the present invention.

FIG. 8 shows the error rate (i.e., 1−prob) in detecting massive value modification for different size of groups v and number of groups g. The assumption that at least one tuple is modified in each group has been made. While all error rates go down exponentially with the group size v, the larger the g, the larger the error rates. The reason is that with larger g, more watermarks are affected by the modification, and more likely at least one watermark remains undetected.

If the modification is applied to primary key attribute values, the probability of detection can be analyzed similarly as for the modification of non-primary key values. As already shown, each tuple with a modified primary key value would remain in the same group with probability 1/g and move out of that group with probability 1−1/g. The moved-out tuple has equal probability 1/g to fall in any other group. Now consider one modified tuple in each group. For any group, the probability that the modified tuple moves out is 1−1/g, and the probability that any tuple from any other group moves in is also 1−1/g. Since the moving-out and moving-in probabilities are the same, each group will have the same probability $p_g$ to contain some modified tuples, and the size of each group will remain roughly the same.

Insert Multiple Tuples

Assume that n tuples are inserted into the data. A group will be called an insert-group if the group contains at least one inserted tuple after the insertion. Since the partition of g groups are kept secret from attackers, when one tuple is inserted, it has equal probability to fall into any group. The probability that the insertion of n tuples will result in m ($m \leq \min(g,n)$) insert-groups, where insert-group i contains $k_i+1$ ($k_i \geq 0$, $$\sum_{i=1}^{m} k_i = n - m)$$

inserted tuples, is $$p\langle k_1, \ldots, k_m \rangle = \binom{g}{m} \frac{n!}{(1+k_1)!(1+k_2)! \cdots (1+k_m)!} \cdot \frac{1}{g^n}$$

where the first term $$\binom{g}{m}$$

is the total number of combinations of m insert-groups selected from g groups, the second term $$\frac{n!}{(1+k_1)!(1+k_2)! \cdots (1+k_m)!}$$

is the number of different sequences (or permutations) of the inserted tuples falling in different insert-groups, and the last term $1/g^n$ is the probability of any sequence. A sequence indicates which inserted tuple falls into which insert-group in which order. After the modification, a watermark in insert-group i has $(v+k_i+1)/2$ bits. Therefore, the probability that all insertions can be detected is $$Prob = \sum_{m=1}^{\min(g,n)} \sum_{\substack{k_1, \ldots, k_m \geq 0 \\ k_1 + \ldots k_m = n-m}} p\langle k_1, \ldots, k_2 \rangle \left(1 - \frac{1}{2^{\frac{v+k_1+1}{2}}}\right) \cdot \quad (9)$$

$$\left(1 - \frac{1}{2^{\frac{v+k_2+1}{2}}}\right) \cdots \left(1 - \frac{1}{2^{\frac{v+k_m+1}{2}}}\right)$$

EXAMPLE 2

Consider example 1 except that n=3 tuples are inserted rather than modified. When a tuple is inserted, it has equal probability $$\frac{1}{g} = \frac{1}{3}$$

to fall in any particular group. The insertion of three tuples may lead to one or two or three insert-groups. The analysis is similar to example 1 except that the probability of each sequence is always $$\left(\frac{1}{3}\right)^3 = \frac{1}{27}.$$

For the case of one insert-group (m=1), three tuples are inserted in a same group ($k_1=2$) with $$s\langle 2 \rangle = \frac{1}{27} \text{ and } p\langle 2 \rangle = \binom{3}{1} \frac{3!}{3!} \frac{1}{27}.$$

For the case of two insert-groups (m=2), either one or two tuples are inserted in insert-group one ($k_1=0, k_2=1$ or $k_1=1, k_2=0$); therefore, $$s\langle 1, 0 \rangle = s\langle 0, 1 \rangle = \frac{1}{27} \text{ and } p\langle 0, 1 \rangle = p\langle 1, 0 \rangle = \binom{3}{2} \frac{3!}{2!1!} \frac{1}{27}.$$

For the case of three insert-groups, one tuple is inserted in each group ($k_1=k_2=k_3=0$), and results in $$s\langle 0, 0, 0 \rangle = \frac{1}{27} \text{ and } p\langle 0, 0, 0 \rangle = \binom{3}{3} \frac{3!}{1!1!1!} \frac{1}{27}.$$

Therefore, the sum of the probabilities $p\langle \cdot \rangle$ is exactly one:

$$p\langle 2 \rangle + p\langle 0, 1 \rangle + p\langle 1, 0 \rangle + p\langle 0, 0, 0 \rangle = 3 \times \frac{1}{27} + 18 \times \frac{1}{27} + 6 \times \frac{1}{27} = 1.$$

It is easy to verify that when n=1, the probability is the same as that given in section 4.2. For massive insertion where n>g and n/g tuples are inserted into each group on average, the probability can be simplified as:

$$Prob \approx \left(1 - \frac{1}{2^{\frac{v+n/g}{2}}}\right)^g \quad (10)$$

Figure 10:
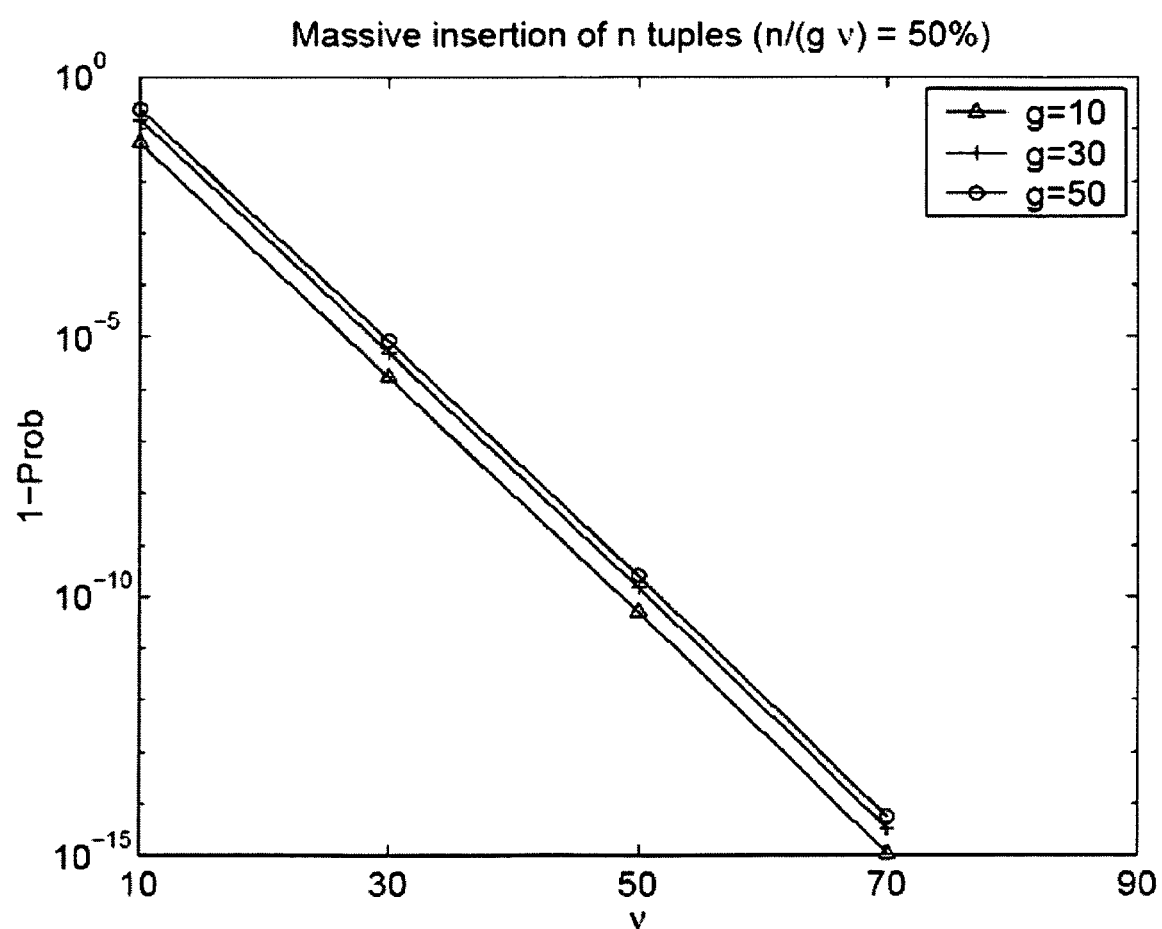
FIG. 10 shows the error rate in detecting massive tuple insertion for an embodiment of the present invention.
Figure 11:
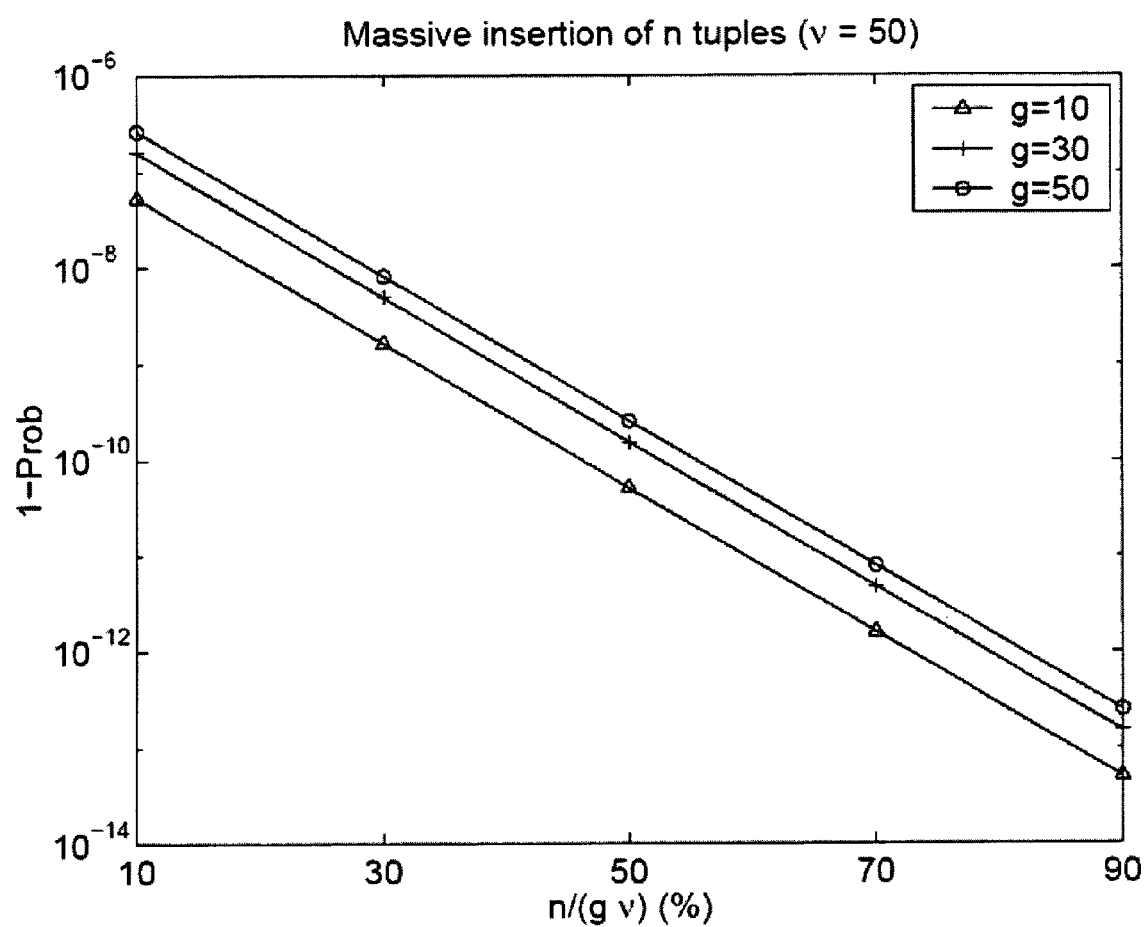
FIG. 11 shows the error rate in detecting massive tuple insertion for an embodiment of the present invention.

FIGS. 10 and 11 show the error rate (i.e., 1−prob) in detecting massive tuple insertion. FIG. 10 shows the error rate for different size of groups v and number of groups g where the inserted tuples are 50% of the number of original tuples. FIG. 11 shows the error rate for different percentage of inserted tuples n/(gv) and number of groups g where the group size is 50. In this figure, n is set to be >g and the average case where n/g tuples are inserted into each group is considered. Since all groups are affected, we see that the smaller the g, the smaller the error rates. We also see that the error rate decreases exponentially with group size v and percentage n/(gv) because the length of affected watermarks increases linearly in these cases.

Delete Multiple Tuples

Assume that n tuples are deleted from the data. If at least one but not all tuples are deleted from a group, it will affect the group hash and corresponding watermark in a random way. If all tuples are deleted from one group, there is no way to detect the modification, in which case the probability of detection is zero. For convenience, a group is called a delete-group if at least one tuple in the group is deleted from the group.

Every tuple is assumed to have equal probability to be deleted. The probability that the first tuple is deleted from any particular group is $v/(gv)=1/g$. After i tuples being deleted, the probability that the next tuple is deleted from a particular group consisting of v−k tuples, is $(v-k)/(gv-i)$.

Assume that the deletion of n tuples will result in m ($m \leq \min(g,n)$) delete-groups and that $k_i+1$ ($0 \leq k_i < v$) tuples are deleted from delete-group i (i−1, ..., m). The analysis is similar to what has already been shown because the probability that an un-deleted tuple is deleted is the same as the probability that an un-modified tuple is modified. Given a sequence which indicates which tuple is deleted from which group and in which order, one can verify that the probability of the sequence is the same as $s \langle k_1, \ldots, k_m \rangle$ given in equation 5. Also the probability that the deletion will result in m delete-groups is the same as $p \langle k_1, \ldots, k_m \rangle$ given in equation 6. After the deletion, a watermark in delete-group i has $(v-k_i-1)/2$ bits (this is different from the modification case). Therefore, the probability that all deletions can be detected is $$Prob = \sum_{m=\lceil n/v \rceil}^{\min(g,n)} \sum_{\substack{0 \leq k_1, \ldots, k_m < v \\ k_1 + \ldots k_m = n-m}} p \langle k_1, \ldots, k_m \rangle \left(1 - \frac{1}{2^{\frac{v-k_1-1}{2}}}\right) \cdot \left(1 - \frac{1}{2^{\frac{v-k_2-1}{2}}}\right) \ldots \left(1 - \frac{1}{2^{\frac{v-k_m-1}{2}}}\right) \quad (11)$$

One can verify that when n=1, the probability is the same as that given earlier. For massive deletion where n>g and n/g tuples are deleted from each group on average, the probability can be simplified as:

$$Prob \simeq \left(1 - \frac{1}{2^{\frac{v-n/g}{2}}}\right)^g \quad (12)$$

Figure 12:
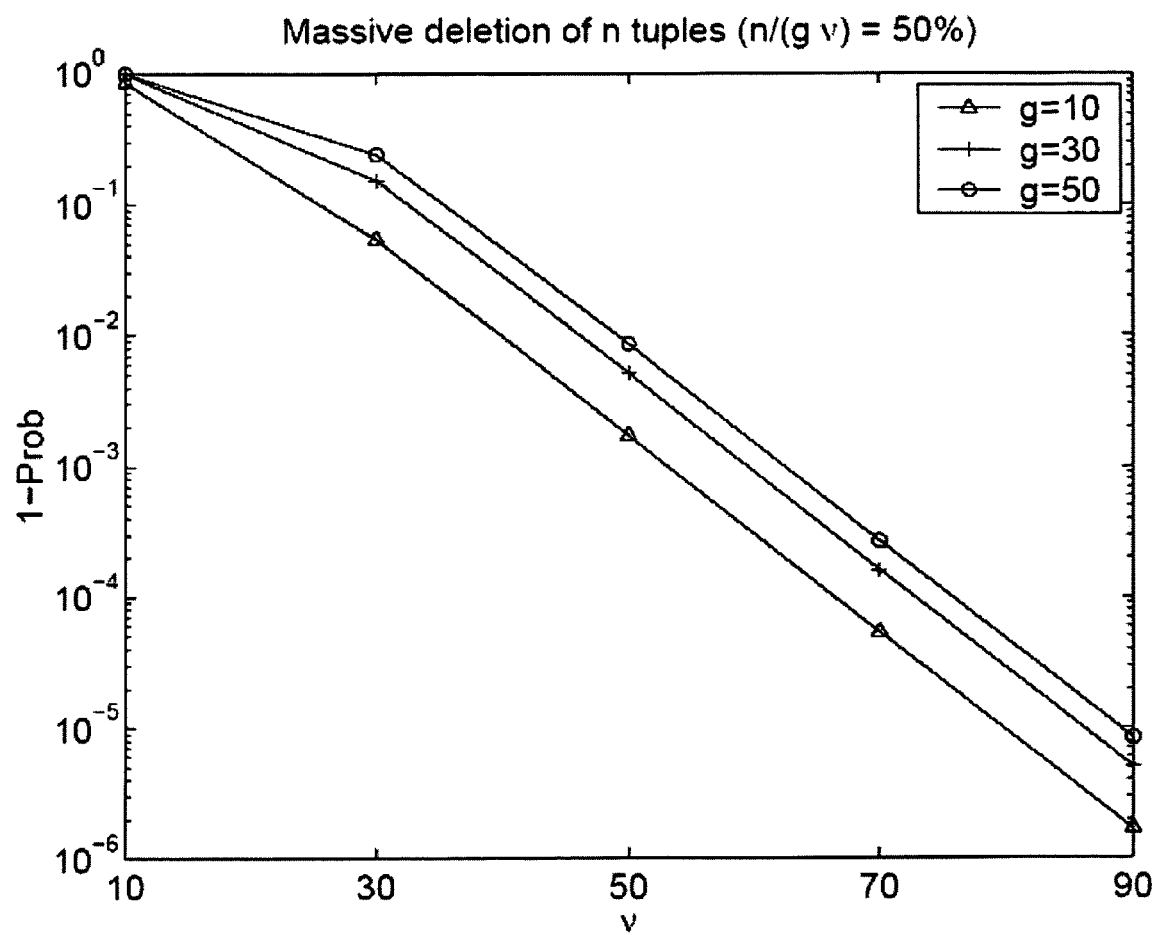
FIG. 12 shows the error rate in detecting massive tuple deletion for an embodiment of the present invention.
Figure 13:
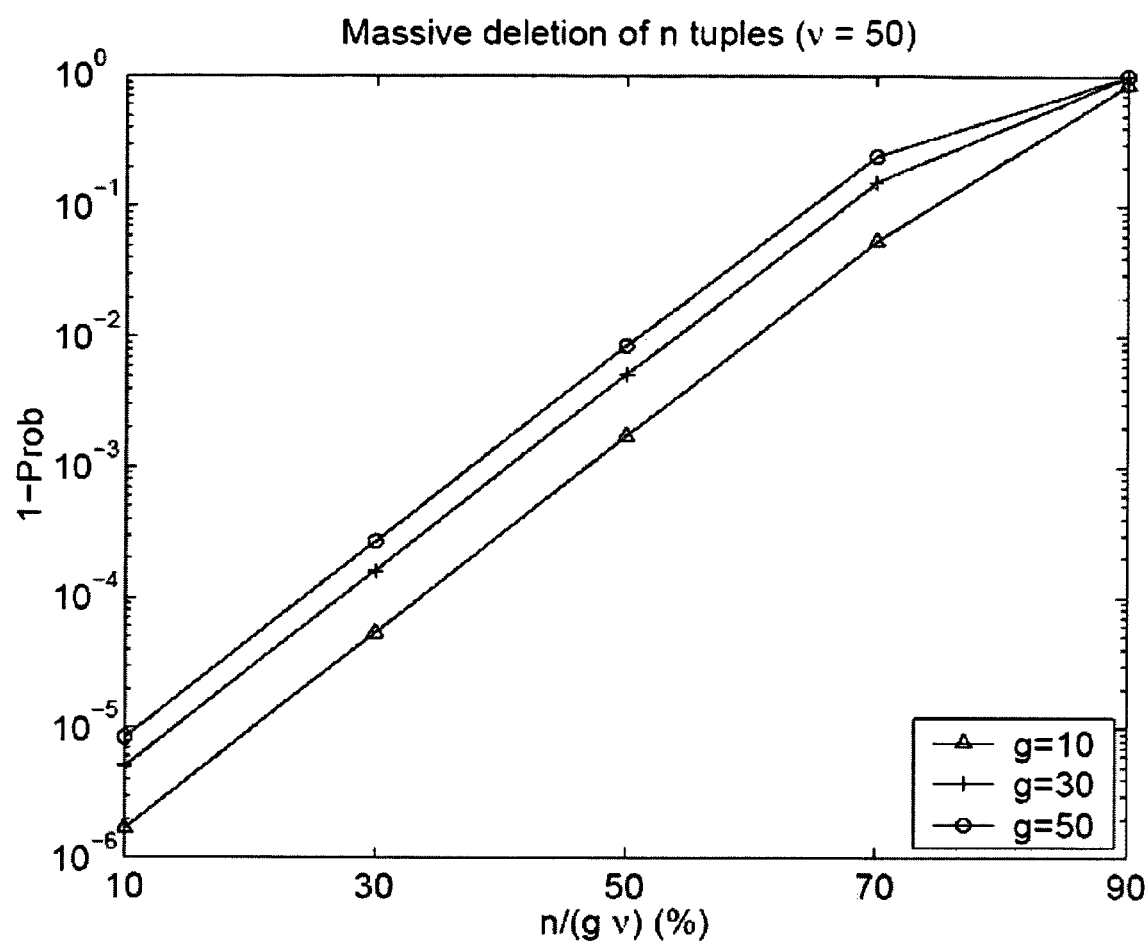
FIG. 13 shows the error rate in detecting massive tuple deletion for an embodiment of the present invention.

FIGS. 12 and 13 shows the error rate (i.e., 1-prob) in detecting massive tuple deletion. FIG. 12 shows the error rate for different size of groups v and number of groups g where 50% of the tuples are deleted. FIG. 13 shows the error rate for a different percentage of deleted tuples n/(gv) and a number of groups g where the group size is 50. In this figure, we set n was set to be >g the average case where n/g tuples are deleted from each group was considered. Since all groups are affected, the error rate is monotonic increasing with g. On the other hand, the more the tuples are deleted, the less the length of the affected watermark, and the larger the error rate. Increasing v has similar effect on the detection probability as decreasing n/g.

Comparison of Detecting Massive Tampering

Figure 9:
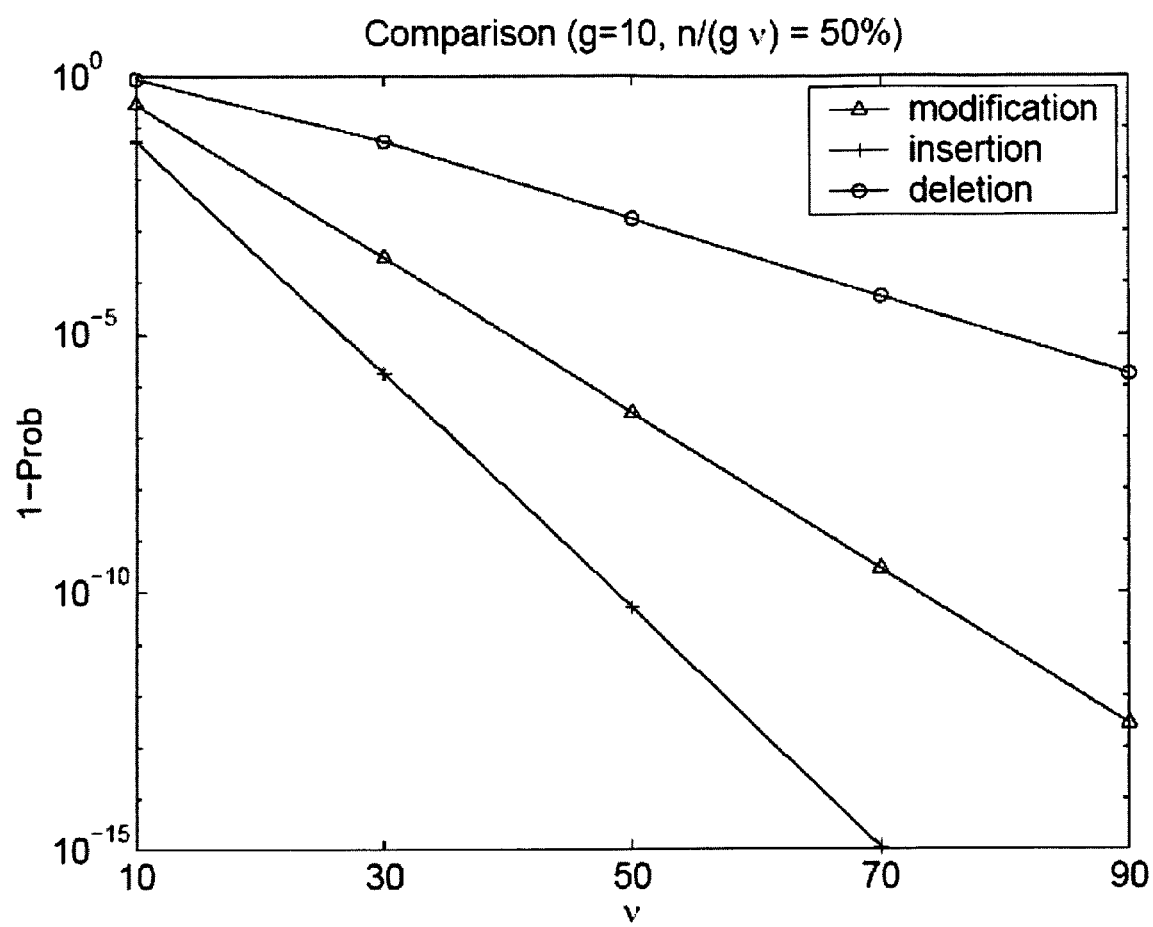
FIG. 9 shows error rate in detecting massive tampering for different group sizes for an embodiment of the present invention.

FIG. 9 compares the error rate in detecting massive tampering (massive value modifications, tuple insertions and tuple deletions) for different group sizes where g=10 and n/(gv)=50%. With group size increasing, all error rates decrease (exponentially) because the length of affected watermarks increases (linearly). For the same group size, tuple deletion always yields larger error rate than tuple modification, which yields larger error rate than tuple insertion. The reason is that the length of affected watermarks decreases, remains the same, and increases, respectively, in tuple deletion, modification, and insertion.

Discussion on Group Size

The group size v may be a very important parameter in the present invention. It partially decides how the tuples are grouped. If an attacker knows the group size, combined with the knowledge of the secret key K, he can simply delete all tuples in a group, the scheme will fail to detect this kind of modifications. Thus, to foil this attack, we must keep group size or the secret key secure so that an attacker will not have any knowledge of the grouping information used for watermark embedding.

The length of each watermark v/2 is half the group size. On the one hand, the larger the group size, the larger the probability of detecting modifications in watermark detection, and the more secure is the proposed scheme. On the other hand, the larger the group size, less precisely one can localize modifications because there are more tuples in each group (recall that a group is the finest granularity in localization). Therefore, trade-offs may be made between security and localization when choosing the group size v.

In embodiments of the present invention and analysis, the group size v is decided by the number of groups g and the total number of tuples in data. Given v, the larger the g, smaller the probability of tamper detection (see previous subsections). If g is too large, one can easily partition the groups into smaller collections, and then apply watermark detection to each of the collections (this is equivalent to decreasing g without changing v) such that the probability of tamper detection is large enough within each collection.

In this scheme, since an attacker's purpose is to make his modifications undetectable by keeping the embedded watermarks untouched, it is unreasonable for him to make lots of modifications. Given the group size and the number of groups in each collection, the more modifications an attacker makes, the more likely his modifications will be detected. In this scheme, the purpose is to keep the detection probability as high as possible. After all, it is more important to detect modifications than to narrow down the range of modifications.

Conclusions

The present invention is a novel fragile watermarking scheme that addresses the problem of tamper detection and localization for a database relation with categorical attributes. Unlike other watermarking schemes which inevitably introduce distortions to the cover data, the present invention embeds a watermark by modifying the order of tuples; thus, it is distortion free. All tuples in a database relation are first securely divided into groups according to some secure parameters. Watermarks are embedded and verified in each group independently. Thus, any modifications can be detected and localized to some specific groups. Security analysis showed that the probability of missing detections is very low.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. For example, one skilled in the art will recognize the present invention could be implemented to watermark relational databases where the data is not just categorical data. For example, one skilled in the art will recognize that the data may also be other types of digital data such as numerical data.

What is claimed is:

1. A tangible computer-readable medium encoded with instructions, wherein execution of the instructions by one or more processors causes the "one or more processors" to apply a fragile watermark to a relational database by performing the steps of:
   a) accessing the relational database, the relational database including relations, the relations including data; the data including at least one tuple, each tuple having an associated primary key;
   b) computing a primary key hash value for at least one tuple according to:
      i) a secret embedding key; and
      ii) the primary key associated with the tuple;
   c) dividing at least two tuples into at least one tuple group based upon the primary key hash value;
   d) sorting at least two of the tuples in at least one tuple group using the primary key hash;
   e) applying said fragile watermark to at least one tuple group without changing the value of any datum in the database;
   f) computing a tuple hash for at least one tuple based on the secret embedding key and all attributes of the tuple;
   g) computing a group hash value for at least one tuple group based on:
      i) the tuple hash of the sorted tuples in the tuple group; and
      ii) the secret embedding key; and
   h) extracting a fragile watermark from the group hash value.

2. A tangible computer-readable medium according to claim 1, wherein attributes are encoded as integers.

3. A tangible computer-readable medium according to claim 2, wherein when an attribute is a string attribute comprising at least one character, the string attribute encoded as the concatenation of the ASCII code of each character in the string attribute.

4. A tangible computer-readable medium according to claim 1, wherein:
   a) the tuples in a tuple group are paired into tuple pairs; and
   b) the length of the fragile watermark is equal to the number of tuple pairs in a tuple group.

5. A tangible computer-readable medium according to claim 4, further including the step of inserting the fragile watermark for a tuple group into the tuple group.

6. A tangible computer-readable medium according to claim 5, wherein the step of inserting the fragile watermark for a tuple group into the tuple group is performed by selectively switching the position of tuples in the tuple pairs using:
   a) the tuple hash associated with each tuple in the tuple pair; and
   b) a corresponding bit in the fragile watermark.

7. A tangible computer-readable medium according to claim 1, wherein the data is categorical data.

8. A tangible computer-readable medium according to claim 1, wherein the data is numeric data.

9. A tangible computer-readable medium according to claim 1, further including the step of verifying at least one tuple group by checking the fragile watermark with an embedded fragile watermark.

10. A tangible computer-readable medium according to claim 9, wherein the embedded fragile watermark is extracted from the tuples in the tuple group, the tuples in the tuple group paired into at least one tuple pair, each tuple pair comprising a first tuple and a second tuple, the embedded fragile watermark comprising at least one fragile watermark bit, each fragile watermark bit associated with a tuple pair.

11. A tangible computer-readable medium according to claim 10, wherein the fragile watermark bit associated with each tuple pair is a "1" if the tuple hash of the first tuple in the tuple pair is larger than the tuple hash of the second tuple in the tuple pair.

12. A tangible computer-readable medium according to claim 9, further including the step of independently verifying at least one other tuple group.

13. A tangible computer-readable medium encoded with instructions, wherein execution of the instructions by one or more processors causes the "one or more processors" to perform the steps of:
   a) accessing a relational database, the relational database including relations, the relations including data; the data including at least two tuples, each of the at least two tuples having an associated primary key;
   b) computing a primary key hash value for the at least two tuples according to:
      i) a secret embedding key; and
      ii) the primary key associated with the at least two tuples;
   c) dividing the at least two tuples into at least one tuple group based upon the primary key hash value;
   d) sorting the at least two tuples in each of the at least one tuple group into sorted at least two of the at least two tuples using a primary key hash;
   e) computing a tuple hash for each of the at least two tuples based on the secret embedding key and all attributes of the at least two tuples;
   f) computing a group hash value for each of the at least one tuple group based on:
      i) the tuple hash of the sorted at least two tuples in the at least one tuple group; and
      ii) the secret embedding key; and
   g) extracting a fragile watermark from the group hash value, the watermark having been applied to the relational database without modifying any data in the relational database.

14. A tangible computer-readable medium according to claim 13, wherein:
   a) the sorted at least two tuples comprise tuple pairs, each tuple pair comprising a first tuple and a second tuple;
   b) the length of the fragile watermark for each of the at least one tuple group is equal to the number of tuple pairs in the at least one tuple group; and
   c) the fragile watermark for the at least one tuple group is embedded into the at least one tuple group by selectively switching the position of the at least two tuples in the tuple pairs using:
      i) the tuple hash associated with each of the at least two tuples in the tuple pair; and
      ii) a corresponding bit in the fragile watermark.

15. A tangible computer-readable medium according to claim 13, wherein an embedded fragile watermark is extracted from the at least two tuples in the at least one tuple group, the at least two tuples in the at least one tuple group comprise tuple pairs, each of the tuple pairs comprising a first tuple and a second tuple, the embedded fragile watermark comprising at least one fragile watermark bit, each fragile watermark bit associated with a tuple pair.

16. A tangible computer-readable medium according to claim 15, wherein the fragile watermark bit associated with each tuple pair is a "1" if the tuple hash of the first tuple in the tuple pair is larger than the tuple hash of the second tuple in the tuple pair.

17. A tangible computer-readable medium according to claim 15, further including the step of independently verifying at least one tuple group by comparing the fragile watermark for each of the at least one tuple group with the embedded fragile watermark for each of the at least one tuple group.

18. A tangible computer-readable medium according to claim 17, further including the step of identifying where the relational database is corrupted by identifying which of the at least one tuple group did not verify.

* * * * *